United States Patent [19]

Adams

[11] Patent Number: 4,581,694

[45] Date of Patent: Apr. 8, 1986

[54] INVERTER USING PARALLEL CONNECTED SERIES PRE-REGULATOR AND A SYNCHRONIZED SWITCH

[75] Inventor: Tello D. Adams, North Seminole, Fla.

[73] Assignee: GTE Business Communications Systems Inc., Reston, Va.

[21] Appl. No.: 627,935

[22] Filed: Jul. 5, 1984

[51] Int. Cl.$^4$ ............................................. H02M 7/538
[52] U.S. Cl. ...................................... 363/97; 323/266; 323/268; 363/23; 363/56
[58] Field of Search .................... 363/23, 37, 56, 97; 323/268, 269, 272, 266, 278

[56] References Cited

U.S. PATENT DOCUMENTS

| 4,034,280 | 7/1977 | Cronin et al. | 363/97 |
|---|---|---|---|
| 4,150,423 | 4/1979 | Boschert | 363/97 |
| 4,344,122 | 8/1982 | Jones | 363/97 |
| 4,502,152 | 2/1985 | Sinclair | 323/268 |

FOREIGN PATENT DOCUMENTS

| 204928 | 12/1982 | Japan | 323/268 |
|---|---|---|---|
| 382081 | 10/1973 | U.S.S.R. | 323/268 |

OTHER PUBLICATIONS

Kitayev et al., "A DC Stabilizer with Continuous and Two-Position Regulation", Telecommunications, vol. 24, No. 6, pp. 30-35, (1970).

Primary Examiner—William H. Beha, Jr.

[57] ABSTRACT

A series regulator responds to an input voltage to produce a constant direct voltage. A resistor is connected at one end to the output of the regulator. A current carrying bus is connected between the other end of the resistor and the input of the inverter whereby current flows through the resistor producing a voltage drop thereacross and thereafter flows into the inverter to supply power thereto. An electronic switch has a closed position at which current on the bus supplied via the resistor is augmented by the current on the bus supplied via the switch. The switch has an open position at which the augmented current is not present on the bus, the switch being placed in the open position whenever a pulse appears in the control voltage and thereafter is placed in the closed position when the pulse disappears and said voltage drop is at least equal to a preselected value.

6 Claims, 3 Drawing Figures

4,581,694

INVERTER USING PARALLEL CONNECTED SERIES PRE-REGULATOR AND A SYNCHRONIZED SWITCH

BACKGROUND OF THE INVENTION

The present invention is directed toward an electrical power supply for use in telecommunications which is characterized by low cost minimized radiation, and self-protection against the more common failure modes.

SUMMARY OF THE INVENTION

A power supply in accordance with the invention utilizes as an input unregulated direct voltage of relatively high value typically obtained via a full wave rectifier and transformer from a conventional alternating current source.

The apparatus also includes a series regulator connected to said common terminal and having an input terminal connected to said first terminal and an output terminal. The regulator responds to said input voltage to produce a constant direct voltage between said output terminal and ground.

A resistor is connected at one end to the output terminal of the regulator.

A current carrying bus is connected between the other end of the resistor and the input terminal of the inverter whereby current flows through said resistor producing a voltage drop thereacross and thereafter flows into the inverter to supply power thereto.

An electronic switch is connected to said common terminal and coupled to said control terminal, said switch having a closed position at which it connects said first terminal to said bus whereby the current on said bus supplied via said resistor is augmented by the current on said bus supplied via said switch. The switch has an open position at which said augmented current is not present on said bus, said switch being placed in the open position whenever a pulse appears in said control voltage and thereafter is placed in the closed position when the pulse disappears and said voltage drop is at least equal to a preselected value.

The amount of current supplied to the inverter varies over the inverter cycle and also varies with the load on the supply. In the absence of a load, the switch is closed only over a selected portion of the period between the arrival times of two successive pulses at the switch. As the loading increases, or line voltage drops, the duration of this selected portion also increases.

DETAILED DESCRIPTION OF THE DRAWINGS

Figure 1:
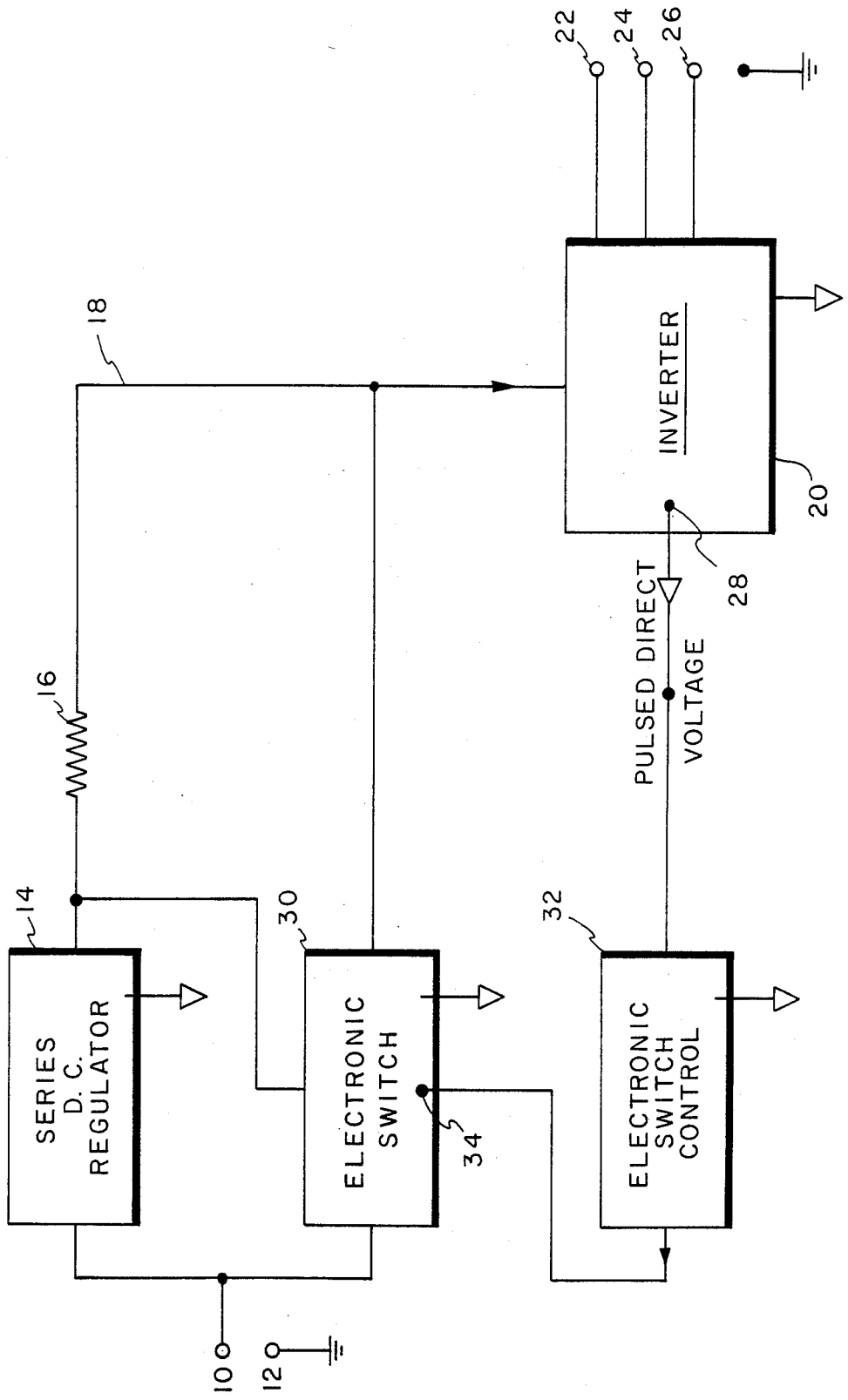
FIG. 1 is a block diagram of the invention.

Referring first to FIG. 1, an unregulated direct voltage typically derived from the output of a diode bridge (full wave rectifier) which in turn rectifies a 24 volt sixty Hz single phase alternating current input supplied from a conventional 120 vac mains source via a step-down transformer, is applied between input terminals 10 and 12. Terminal 12 is grounded and is connected in common to all of the circuit elements shown in block form in FIG. 1.

Terminal 10 is connected to the input of series direct current regulator 14. The output of regulator 14 is connected through resistor 16 to a direct current bus 18 which in turn is connected to an input of inverter 20. Inverter 20 produces between each of output terminals 22, 24, 26 and a separate ground terminal, a different regulated direct voltage such as +5 volts, +12 volts and −12 volts. The inverter also produces at terminal 28 an unregulated control voltage which typically takes the form of unidirectional approximately square-shaped waves which are uniform in shape and size. Each square wave represents a half cycle of inverter operation.

Terminal 10 is also connected through an electronic switch 30 to bus 18 at a point intermediate between resistor 16 and inverter 20.

The control voltage at terminal 28 is supplied through a switch control unit 32 which in turn supplies control pulses to a control terminal 34 on electronic switch 30.

The system thus far described operates in the following manner. Regulator 14 produces a constant direct output voltage whereby the potential at the end of resistor 16 adjacent to regulator 14 remains constant. The regulator is so chosen that it cannot supply enough current through resistor 16 and the current bus to satisfy the requirements of the inverter. As the current flow through resistor 16 increases under loading of the inverter, the voltage drop across resistor 16 increases until the voltage drop between the regulator 14 and the junction of the switch 30 and bus 18, i.e., the voltage drop across resistor 16, reaches a value at which the switch closes and additional current is fed through the switch and bus to the inverter.

Each time a voltage pulse appears in the control voltage, switch control unit sends a control pulse to the switch which opens the switch. The switch remains open until the voltage drop across resistor increases to a value at which the switch is closed.

The amount of current from the original source supplied to the inverter varies over the inverter cycle and also varies with the load on the supply. In the absence of a load, the switch is closed for only a selected portion of the period between the receipt of two successive control pulses by the switch. As the loading increases, the duration of the selected portion increases until at full load the switch is closed except for the instants at which the control pulses are produced.

In other words, the regulator, resistor, current bus and electronic switch under the control of the inverter act as a pulse width modulator to vary the current delivered to the inverter.

Figure 2:
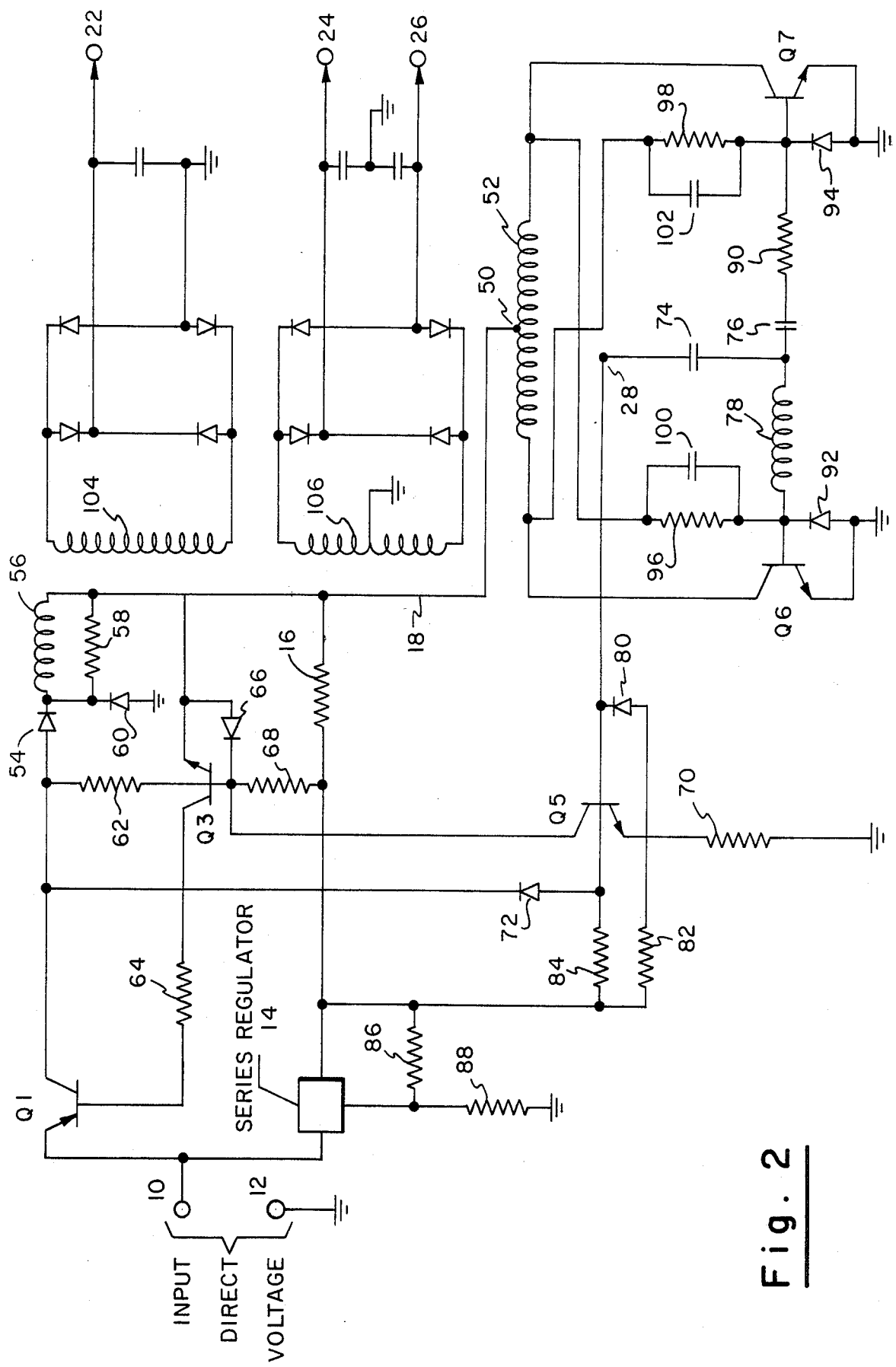
FIG. 2 is a circuit diagram of one embodiment of the invention.

The structure shown in FIG. 1 is illustrated as a circuit diagram in FIG. 2. The terminal 10 is connected to the input of regulator 14, (which typically can be Model LM317 manufactured by National Semiconductor). The output of regulator 14 is connected via resistor 16 to the direct current bus 18. The bus 18 is connected to the center tap 50 of the primary winding 52 of a transformer.

Terminal 10 is also connected to the emitter of transistor Q1. The collector of transistor Q1 is connected via a rectifier 52 and inductor 54 to bus 18. The inductor 54 is shunted by resistor 58 and the junction of rectifier 52 and inductor 54 is grounded through rectifier 60. The collector of transistor Q1 is also connected to the base of transistor Q3 via resistor 62.

The base of transistor Q1 is connected through the resistor 64 and the collector-emitter path of transistor Q3 to bus 18. The emitter of transistor Q3 is connected via rectifier 66 to its base. The base is connected via resistor 68 to junction of regulator 14 and resistor 16 and is also connected via the collector-emitter path of transistor Q5 and resistor 70 to ground.

The junction of the collector of transistor Q1 is connected via rectifier 72 to the base of transistor Q5. This base is also connected through capacitor 74 to the junction of capacitor 76 of the transformer 78. This base is also connected via rectifier 80 and resistor 82 and also via resistor 84 to the junction of regulator 14 and resistor 16. This junction is grounded via resistor 86 and resistor 88 and the regulator 14 is connected to the junction of resistors 86 and 88.

One end of primary winding 52 is grounded via the collector-emitter path of transistor Q7; the other end is grounded via the collector-emitter path of transistor Q6. The bases of transistors Q6 and Q7 are interconnected via a series circuit connecting of secondary winding 78, capacitor 76 and resistor 90. Each of these bases is grounded via a corresponding one of rectifiers 92 and 94 and is connected to an opposite end of the primary winding by resistors 96 and 98. Each of resistors 96 and 98 is shunted by one of capacitors 100 and 102.

As the current flows through the primary winding 52 the voltage developed across the secondary winding 78 produces the drive necessary to operate switching transistors Q6 and Q7. Resistors 96 and 98 bias these transistors in the Class A region and thus permit them to start reliably. Once either transistor Q6 or Q7 conducts, it conducts to saturation and the base drive current passes through one of the rectifiers 92 and 94, through the series circuit and into the base of either of these transistors. The conductive transistor continues to conduct until capacitor 76 charges to the point where insufficient base current is available to sustain the saturated condition. At this point the collector current decreases, causing a field reversal in the transformer which, due to the positive feedback of the secondary winding, is accelerated causing the active transistor to turn off while turning the other one on.

The direct voltage output produced between the various output terminals 22, 24, 26 and the associated ground is derived via secondary windings 104 and 106 and conventional rectifying and filtering circuitry. The input direct voltage less the voltage drop across transistor Q1 is applied across rectifier 52 and inductor 54, to bus 18. Since an initial application of voltage across the inductance produces a voltage drop that decreases with time, the current flow supplied to the bus increased rapidly. However, the transistor Q1 is periodically rendered non-conductive via transistor Q3 each time transistor Q5 is rendered conductive and remains non-conductive thereafter until the voltage drop across the inductor has decreased sufficiently. Transistor Q5 is rendered conductive each time a voltage pulse appears across the secondary winding 78 and is supplied to transistor Q5 via capacitor 74. This portion of the inverter produces the square wave voltage wave form as previously described more particularly as transistor Q1 is turned off its collector voltage falls which causes a positive feedback effect and a rapid fall time. The principal cause of this voltage drop is the inductor current that must be supplied through rectifier 60 from ground when the original feed current decreases. The resistor 58 across inductor 54 keeps it from ringing when this step function occurs. As the collector of the transistor (Q1) approaches ground a current is drawn through rectifier 72 which turns off transistor Q5 and discharges capacitor 74 so that even though the transformer drive voltage is still high, the transistor Q5 remains off.

When the inductor current has ramped its way to zero, its input voltage rises and the bypass circuit has been reset and is once again under the control of the regulator 14 and the resistor 16. The cycle thus repeats. However, the duration of each of the periods of conduction of transistor Q1 is determined by the load requirements, and input voltage 10. The net effect is that transistors Q1, Q3 and Q5 together with the series regulator and the various associated components constitute a pulse width modulator section using the series regulator as its control device, the resulting direct voltage output being used to supply the inverter which then produces the desired output voltages.

Figure 3:
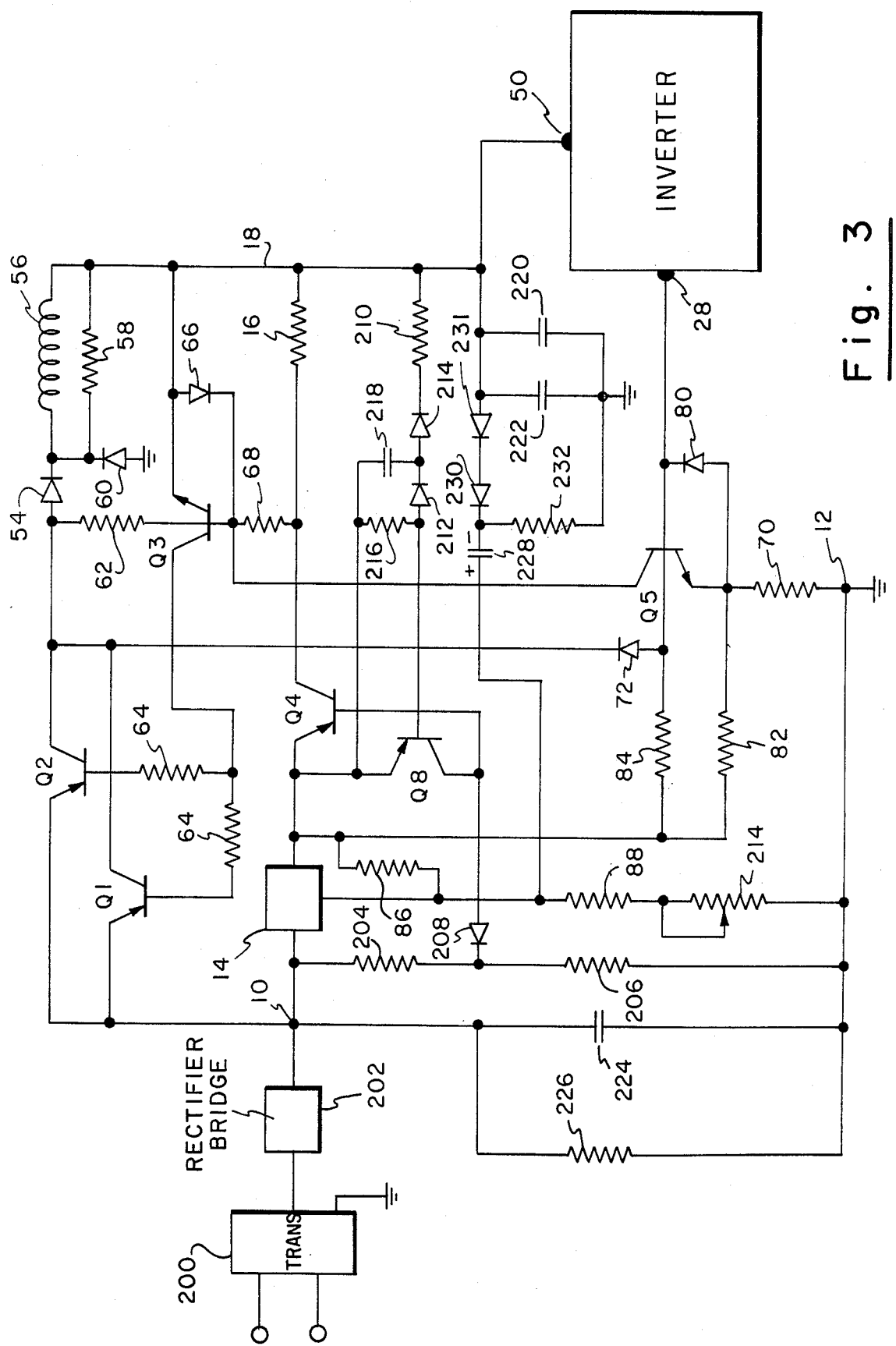
FIG. 3 is a circuit diagram of another embodiment of the invention.

Referring now to FIG. 3, the current of FIG. 2 has been augmented by the addition of additional components. Transistor Q2 has been added in parallel with transistor Q1 to increase current handling capacity. Alternating voltage from a conventional source is fed through a transformer 200 and a rectifier 202 before being supplied to the transistors Q1 and Q2 and to the series regulator 14. An approximate thermal balance between the two transistors is achieved in this instance by supplying fixed, independent, base drive current through the two resistors 64.

Power supplies are subject to a variety of fault and transient conditions during use and must be protected against some of them while allowing for others. The first of these faults would permit a large direct voltage to be applied to the input instead of the alternating voltage from the transformer 200. To prevent this from causing damage the inverter feed must be shut down promptly. This is accomplished by having the excessive input voltage applied, through the resistance voltage divider 204 and 206, to rectifier 208 and the base of transistor Q4, thereby turning it off. This not only prevents current from flowing from the regulator to the load but also eliminates the drop across resistor 16 which turns off the transistor Q3. As a result the voltage of bus 18 falls drawing current through resistor 210, rectifiers 212 and 214 and the base-emitter junction transistor Q8 which latches transistor Q4 in the off state. This condition may be maintained indefinitely. Removing the supply input voltage for some moderate period of time causes the cutoff to be reset and, subsequently, connecting the unit to the correct voltage will result in proper operation. Resistor 216 allows a bias current to flow through the rectifiers 212 and 214 when transistor Q4 is off and prevents it from turning on until the drop, from regulator to bus, reaches a desired value. The capacitor 218 holds the fault switch off during initial turn on, or power "flickers", for the fraction of a second necessary to allow the supply to establish normal operation. The resistor 210 limits the base current of transistor Q8 to a reasonable value when the supply is latched off. Another fault condition that could occur in either the supply output, or the equipment it powers, is a short circuit.

To protect against this the following sequence of events takes place. When an output short occurs, the transformer field is reduced causing less voltage to be induced in the other secondary windings, including the one that turns off transistor Q4. When this signal no longer has sufficient peak to peak amplitude to pump current through the base emitter junction of transistor Q5, and back through the resistor 70 and rectifier 80 (which also protects the base-emitter junction of transistor Q5), the transistor is turned on through action of resistor 84. This action causes the switch to be disabled and the bus 18 voltage to fall. Current is then drawn from the base of transistor Q8 and the latched off state, as previously described, quickly occurs. As with the over voltage case, the turnoff time is less than one second, the condition can be maintained indefinitely, and may be reset by removing the input power for the requisite period of time. If this is done but the supply is reconnected with either of these faults still present it will again latch off without damage. Resistor 82 is used to prebias the resistor 70 of transistor Q5 and prevent this transistor from being turned on by minor transients or noise on the transformer secondary.

Yet another fault condition could occur if the inverter failed to start when power is applied or after a shutdown due to a component failure. In either case the absence of a drive to the base of transistor Q5 initiates the mechanism just described and results in the same latched off state. The regulator itself (14) has an internal, thermal safety to save it in the event of a failure ahead of transistor Q1. The regulator output voltage is set by the combination of resistor 86, resistor 88 and variable resistor 214 so that accurate output voltages are produced when the supply drives a nominal load. Capacitor 224 shunts resistor 226 to prevent ripple from adversely influencing this voltage. The capacitors 220 and 222 serve to filter the bypass current from inductor 54 and minimize voltage swings on the bus, 18.

Under some conditions a type of operatation can occur where the Bus voltage does not fall sufficiently to cause the transistors Q1 and Q2 to turn on during the next inverter cycle. Should this occur, by the time the cycle after that occurs these transistors will turn on immediately and the maximum current will be drawn. Since this present action will occur when the line voltage is high, the current approaches the set conduction limits of transistors Q1 and Q2 and the ripple voltage on the bus increases. While output voltages do not change, in this "skip mode" of operation, the pulse train becomes irregular and current amplitudes become variable. To prevent this, capacitor 228 is used to provide a trigger voltage reference inversely proportional to the pulse width required which then causes the bypass circuit to operate every cycle in a uniform fashion.

What is claimed is:

1. A power supply for converting an unregulated direct current input voltage of relatively high value to at least one regulated output voltage of relatively low value, said supply comprising:

first and second input terminals, the second terminal being a common terminal, said input voltage being applied between said first and second terminals;

an inverter connected to said common terminal, said inverter having an input terminal, a control terminal and an output circuit, said regulated output voltage appearing in the inverter output circuit, said inverter producing a control voltage between said control terminal and said common terminal, said control voltage being a pulsating direct voltage containing periodically generated pulses;

a series regulator connected to said common terminal and having an input terminal connected to said first terminal and an output terminal, said regulator responding to said input voltage to produce a constant direct voltage between said output terminal and ground;

a resistor connected at one end to the output terminal of the regulator;

a current carrying bus connected between the other end of the resistor and the input terminal of the inverter whereby current flows through said resistor producing a voltage drop thereacross and thereafter flows into the inverter to supply power thereto; and an electronic switch connected to said common terminal and coupled to said control terminal, said switch having a closed position at which it connects said first terminal to said bus whereby the current on said bus supplied via said resistor is augmented by the current on said bus supplied via said switch, said switch having an open position at which said augmented current is not present on said bus, said switch being placed in the open position whenever a pulse appears in said control voltage and thereafter is placed in the closed position when the pulse disappears and said voltage drop across said resistor is at least equal to a preselected value.

2. The supply of claim 1 wherein the regulator, resistor, bus and switch under the control of the inverter function as a pulse width modulator to vary the current delivered to the inverter.

3. The supply of claim 2 wherein said switch includes an electronic switch section and an electronic switch control section.

4. The supply of claim 3 wherein said switch section is connected by a first lead to the input terminal of the regulator, by second lead to the junction of the regulator and the resistor and by a third lead to the junction of the bus and the resistor.

5. The supply of claim 4 wherein said switch section is connected via a fourth lead and said switch control section to the control terminal of the inverter.

6. The supply of claim 5 wherein said switch section includes two transistors and said switch control section includes another transistor.

* * * * *